Patented May 29, 1934

1,960,994

UNITED STATES PATENT OFFICE 1,960,994

MOLDING OF BEESWAX CANDLES AND THE PRODUCT THEREOF

Leon W. Geller, Syracuse, N. Y., assignor to The Will & Baumer Candle Company, Incorporated, Syracuse, N. Y., a corporation of New York No Drawing. Application December 7, 1929, Serial No. 412,577

1 Claim. (Cl. 87—21)

This invention relates to certain new and useful improvements in molding of beeswax candles and the product thereof.

Heretofore it has been impossible to practically mold beeswax candles and for that reason other methods such as dipping have been resorted to.

I have discovered a method by means of which beeswax candles can be practically and commercially molded and have carried out such process and produced a novel product, viz, a molded beeswax candle.

My discovery resides in the fact that I have found that beeswax can be practically molded in the presence of organic solvents such as monoethylene-glycol, diethylene-glycol, etc. The term, organic solvent, as used in the specification and claim hereof is understood to include any organic substance which serves as solvent for nitrocellulose, cellulose acetate, natural and artificial resins, rubber, etc., or any organic solvent used to dissolve any organic substance.

In carrying out my process, various proportions of organic solvents, beeswax and fatty acid may be used and the temperature and time regulated in accordance with the requirements of the mixture and the result desired. However, the following may be taken as an example: To a mixture of seventy (70) parts beeswax, twenty (20) parts stearic acid, ten (10) parts paraffine, is added one (1) part monoethylene-glycol. The heated mixture is poured into the mold. The finished candle is taken out after it has been sufficiently cooled.

Further, it may be desirable to add to the mixture or mixtures described, a percentage of an organic plasticizer such as butyl-stearate, amyl-phthalate, etc. or it may be desirable to substitute a percentage of an organic plasticizer for a portion of the organic solvent as described and for that reason as a sub-combination, I desire to claim herein not only the method which comprises the use of an organic solvent, but also the method and the product resulting therefrom which comprises the molding of beeswax candles in the presence of both an organic solvent and an organic plasticizer as described. By the term organic plasticizer as used herein, is understood any organic substance which serves as plasticizer for nitrocellulose, cellulose, acetate, natural and artificial resins, rubber, etc., or any organic plasticizer used as such for any material.

I claim:

A molded candle comprising a mixture of seventy parts of beeswax, twenty parts of stearic acid, ten parts of paraffin and one part of monoethyl-glycol.

LEON W. GELLER.